United States Patent Office 3,185,684
Patented May 25, 1965

3,185,684
SUBSTITUTED STEROIDAL ISOXAZOLES
Pietro de Ruggieri, Carmelo Gandolfi, and Umberto Guzzi, Milan, Italy, assignors to Ormonoterapia Richter S.p.A., a corporation of Italy
No Drawing. Filed May 10, 1963, Ser. No. 279,630
Claims priority, application Italy, May 12, 1962,
9,512/62
5 Claims. (Cl. 260—239.55)

This invention relates to [3,2-c]-isoxazoles of androstane and of estrane substituted in the 5' position of the heterocyclic ring with an amino group, a halogen, or a hydroxy group, represented by the general formula

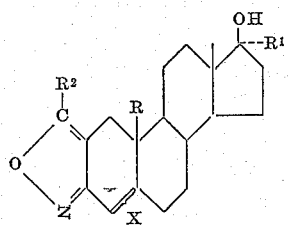

wherein R and $R^1$ are members selected from the group consisting of hydrogen and methyl, $R^2$ is a member selected from the group consisting of halogen, amino- and hydroxy-groups, and X is a single or double bond.

To prepare these compounds, which are endowed with remarkable anabolic activity, 2α-cyano-3-keto-androstanes and -estranes obtained by alkali treatment of the corresponding [2,3-d]-isoxazoles (F. A. Zderic et al., Chemistry and Industry, 1960, page 1625, and R. O. Clinton et al., Journal Organic Chemistry, 26, 279, 1961) were reacted with hydroxylamine to obtain 5'-amino-[3,2-c]-isoxazoles, which in turn yielded 5'-hydroxy-[3,2-c]-isoxazoles through acid hydrolysis, and the 5'-halo-derivatives through diazotization and substitution.

The following examples are offered by way of illustration of this invention and are not to be construed as a limitation thereof.

EXAMPLE NO. 1

5α-androstane-17β-ol-[3,2-c]-5'-amino-isoxazole

A solution of 0.24 part of hydroxylamine hydrochloride and 0.464 part of sodium acetate trihydrate in 2 parts of water were added to a solution of 1 part of 2α-cyano-5α-androstane-17β-ol-3-one in 6 parts of ethanol. After refluxing for 1 hour, the mixture was cooled and fully diluted, and the obtained product was recovered by filtration and recrystallized from methanol. Yield: 0.97 part of 5α-androstane-17β-ol-[3,2-c]-5'-amino-isoxazole; M.P. 226–228° C., and $[α]_D=+49°$ (ethanol).

The following compounds were prepared by the same procedure from the corresponding cyano ketones:

17α-methyl-5α-androstane-17β-ol-[3,2-c]-5'-amino - isoxazole, M.P. 256° C.; $[α]_D=+23°$ (chlorofrom); crystallization from methanol.
Androst-4-ene-17β-ol-[3,2-c]-5'-amino - isoxazole, M.P. 145–150° C.; $[α]_D=+108°$ (chloroform), crystallization from ethyl ether.
5α-estrane-17β-ol-[3,2-c]-5'-amino-isoxazole, M.P. 243° C.; $[α]_D=+95°$ (pyridine), crystallization from ethyl acetate.

EXAMPLE NO. 2

5α-androstane-17β-ol-[3,2-c]-5'-amino-isoxazole 0.5 part of hydroxylamine hydrochloride was added to a solution of 1 part of 2α-cyano-5α-androstane-17β-ol-3-one in 10 parts of pyridine. The mixture was allowed to stand overnight at room temperature, diluted with water and filtered to give 0.95 part of 2α-cyano-5α-androstane-17β-ol-3-one-3-oxime (M.P. 212° C. with decomposition; $[α]_D=+60°$ (dioxane)), which were then refluxed for 30' with 6 parts of pyridine. The mixture was then fully diluted, and the product was collected by filtration and recrystallized from methanol. Yield: 0.88 part of 5α-androstane-17β-ol-[3,2-c]-5'-amino-isoxazole; M.P. 226–228° C.; $[α]_D=+49°$ (ethanol).

EXAMPLE NO. 3

17α-methyl-androst-4-ene-[3,2-c]-5'-amino-isoxazole 0.25 part of hydroxylamine hydrochloride was added to 0.5 part of 17α-methyl-2α-cyano-androst-4-ene-17β-ol-3-one dissolved in 5 parts of pyridine. The mixture was stored overnight at room temperature and then diluted with water to give 0.48 part of 17α-methyl-2α-cyano-androst-4-ene-17β-ol-3-one-3-oxime (M.P. 138–142° C.; $[α]_D=+172°$ (pyridine)), which were refluxed for 30 minutes with 5 parts of pyridine. The mixture was concentrated and then diluted, and the so-obtained product was recrystallized from methylene chloride-acetone. Yield: 0.38 part of 17α-methyl-androst-4-ene-[3,2-c]-5'-amino-isoxazole; M.P. 223–225° C., and $[α]_D=+89°$ (pyridine).

EXAMPLE NO. 4

5α-androstane-17β-ol-[3,2-c]-5'-chloro-isoxazole

Two parts of a 10.5% sodium nitrite solution were added with stirring, over a period of 1 hour, to a solution of 1 part of 5α-androstane-17β-ol-[3,2-c]-5'-amino-isoxazole in 80 parts of concentrated hydrochloric acid, the mixture being cooled throughout such addition to a temperature of −10° C. 0.2 part of copper powder was then added, and stirring was kept up for another 60 minutes, the temperature of the reacting mass being kept in the meanwhile at a temperature ranging from −8 to −3° C. The mixture was then neutralized with sodium hydroxide and extracted with ethyl acetate, and the extract was washed with ammonia and water until neutral. The organic layer, by evaporation of the solvent and subsequent recrystallization from acetone, yielded 0.42 part of 5α-androstane-17β-ol-[3,2-c]-5'-chloro - isoxazole; M.P. 208–210° C., and $[α]_D=53°$ (pyridine).

EXAMPLE NO. 5

5α-androstane-17β-ol-[3,2-c]-5'-bromo-isoxazole 0.5 part of bromine, and subsequntly 6 parts of an 18% sodium nitrite solution were added to a solution of 1 g. of 5α-androstane-17β-ol-[3,2-c]-5'-amino-isoxazole in 100 parts of 48% hydrobromic acid, while cooling to about −5° C. At the end of 1 hour, the mixture was made alkaline with sodium hydroxide and extracted with ethyl acetate. The solvent was evaporated from the organic phase and the product was chromatographed on alumina. Yield: 0.25 part of 5α-androstane-17β-ol-[3,2-c]-5'-bromo-isoxazole, having M.P. 164° C.; and $[α]_D=+71°$ (chloroform).

EXAMPLE NO. 6

5α-androstane-17β-ol-[3,2-c]-5'-hydroxy-isoxazole

One part of 5α-androstane-17β-ol-[3,2-c]-5'-amino-isoxazole was refluxed for 20 hours with 10 parts of ethanol and 10 parts of 20% (v./v.) sulfuric acid. After sodium hydroxide was added to neutrality, the mixture was diluted, and the product was collected by filtration and recrystallized from ethanol. Yield: 0.85 part of 5α-androstane-17β-ol-[3,2-c]-5'-hydroxy-isoxazole; M.P. 243–245° C. (with decomposition), and $[α]_D=+46°$ (pyridine).

EXAMPLE NO. 7

*17α-methyl-5α-androstane-17β-ol-[3,2-c]-5'-hydroxy-isoxazole*

One part of 17α-methyl-5α-androstane-17β-ol-[3,2-c]-5'-amino-isoxazole was refluxed for 120 hours with 15 parts of ethanol, 2 parts of water and 7 parts of Amberlite IRC–120 (acid form). The mixture was filtered and the filtrate concentrated: the solid product which was formed was recrystallized from ethanol. Yield: 0.57 part of 17α-methyl-5α-androstane-17β-ol-[3,2-c]-5'-hydroxy-isoxazole; M.P. 265–268° C., and $[\alpha]_D = +48°$ (benzyl alcohol).

What we claim is:
1. A compound of the formula

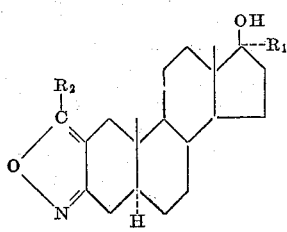

wherein $R_1$ is a member selected from the group consisting of hydrogen and methyl and $R_2$ is a member selected from the group consisting of chloro, bromo and hydroxy.
2. 5α-androstane-17β-ol-[3,2-c]-5'-chloro-isoxazole.
3. 5α-androstane-17β-ol-[3,2-c]-5'-bromo-isoxazole.
4. 5α-androstane-17β-ol-[3,2-c]-5'-hydroxy-isoxazole.
5. 17α-methyl-5α-androstane-17β - ol - [3,2-c] - 5' - hydroxy-isoxazole.

References Cited by the Examiner
UNITED STATES PATENTS

| | | | |
|---|---|---|---|
| 3,080,359 | 3/63 | Ringold et al. | 260—39.5 |
| 3,100,771 | 8/63 | Manson | 260—239.5 |
| 3,145,200 | 8/64 | Clinton et al. | 260—239.55 |

OTHER REFERENCES

Finar: Organic Chemistry, vol. 1, p. 559, 3rd ed. (1959), Longmans, Green & Co., New York.

Marchetti et al.: Gazz. Chim. Stal. 91, pp. 1133–41 (1961).

LEWIS GOTTS, *Primary Examiner.*